(12) United States Patent
Knupfer et al.

(10) Patent No.: US 11,796,075 B2
(45) Date of Patent: Oct. 24, 2023

(54) FUNCTIONAL UNIT

(71) Applicant: OBLAMATIK AG, Chur (CH)

(72) Inventors: Daniel Knupfer, Trimmis (CH); Roland Obrist, Scharans (CH)

(73) Assignee: OBLAMATIK AG, Chur (CH)

( * ) Notice: Subject to any disclaimer, the term of this patent is extended or adjusted under 35 U.S.C. 154(b) by 162 days.

(21) Appl. No.: 17/429,522

(22) PCT Filed: Feb. 14, 2019

(86) PCT No.: PCT/EP2019/053626
§ 371 (c)(1),
(2) Date: Aug. 9, 2021

(87) PCT Pub. No.: WO2020/164706
PCT Pub. Date: Aug. 20, 2020

(65) Prior Publication Data
US 2022/0107029 A1    Apr. 7, 2022

(51) Int. Cl.
*F16K 11/22*    (2006.01)
*F16K 11/24*    (2006.01)
*G05D 23/19*    (2006.01)

(52) U.S. Cl.
CPC .............. *F16K 11/22* (2013.01); *F16K 11/24* (2013.01); *G05D 23/1919* (2013.01)

(58) Field of Classification Search
CPC .............................. F16K 11/22; F16K 31/535
See application file for complete search history.

(56) References Cited

U.S. PATENT DOCUMENTS

2008/0112843 A1* 5/2008 Peel .................. G05D 23/1393
                                                          422/38
2010/0044610 A1    2/2010 Badosa Carbones
(Continued)

FOREIGN PATENT DOCUMENTS

DE         10119690 C1    12/2002
EP         0195271 A2      9/1986
(Continued)

OTHER PUBLICATIONS

International Search Report for corresponding PCT application No. PCT/EP2019/053626, dated Oct. 25, 2019.

*Primary Examiner* — Reinaldo Sanchez-Medina
(74) *Attorney, Agent, or Firm* — Notaro, Michalos & Zaccaria P.C.

(57) ABSTRACT

A functional unit for sanitary facilities having a cold water and hot water inflow and one mixed water outlet that has a mixer, a distributor connected by a connection channel and an electronic control to which are connected sensors and electromotive actuators, the mixer and the distributor are designed as cartridges having electromotive actuators and the cartridges are designed as valves that can be flowed through axially, having axial and/or radial inlets and outlets that have disks arranged in the interior radially and on top of one another and each have at least one outlet opening, one of these disks being rotatable on a stator disk, the rotatable disk engages with an axially rotatable sleeve axially arranged in the respective valve and the cavity can be flowed through, and the outer circumference of the sleeve is operatively connected to the respective electromotive actuator, is disclosed.

16 Claims, 8 Drawing Sheets

(56) References Cited

U.S. PATENT DOCUMENTS

2011/0284101 A1* 11/2011 Thurau ................ F16K 37/005
                                                                                 137/468
2012/0187200 A1* 7/2012 Thurau .............. G05D 23/1393
                                                                                 236/12.12

FOREIGN PATENT DOCUMENTS

| EP | 1240564 B1 | 9/2003 |
| EP | 2604896 A1 | 6/2013 |
| EP | 1844380 B1 | 9/2018 |
| FR | 2340424 A1 | 9/1977 |
| WO | 2020057736 A1 | 3/2020 |
| WO | 2020151808 A1 | 7/2020 |

* cited by examiner

FUNCTIONAL UNIT

The present invention relates to a functional unit in the field of sanitary facilities. In sanitary engineering, a functional unit is understood to be a unit which can also be circumscribed as the central operating part of a sanitary fitting. In this context, such functional units generally comprise valves, in particular mixing valves in the case of water fittings, in order, for example, to mix water from a cold-water connection and from a hot-water connection in a specific ratio, and to discharge the mixed water at a desired mixing temperature to at least one point of use.

Functional units can be operated manually with a lever (single-lever mixer), or controlled by a thermostat, or via an electronic control element by motorized actuators. The latter can also be carded out from a control unit. Functional units can comprise several elements, not all of which need to be housed in one or the same housing. A functional unit can be either a mixing valve by itself or a combination of mixing valve and distributor. In this context, a distributor is understood to be a discharge point having at least one outlet that is connected to the mixer. A combination of mixer and distributor represents a functional unit in the general sense of the present invention.

The patent specification DE 101 19 690 C1 describes the basic principle of a sanitary installation in a bathroom. The central part of this sanitary installation is a mixing fitting with two valves for the inlet of cold water and hot water, a mixed-water channel with temperature sensor and flow measuring device, and a distributor having electromagnetic shut-off valves to the mixed-water outlets. This equipment is controlled by an electronic control system.

The same basic principle for sanitary supply in a bathroom with a corresponding functional unit is also shown in the patent application FR 2 340 424 A1 in the figures.

EP 0 195 271 A2 describes a water installation for washrooms with several washing facilities. Here, the electronic control system is located in a central control box in a box and the electro-hydraulic elements are located in a room compartment. The pipe connections are arranged on the wall or floor of this room compartment, namely a cold-water inlet and a hot-water inlet, as well as the outlets for the mixed water to the individual consumption points, e.g. several washing troughs and showers. The electro-hydraulic elements in said room compartment include a mixing valve motor-controlled by a belt drive, a temperature sensor in the mixed-water pipe, and a mixed-water distributor with pipe branching and separate solenoid valves to each individual outlet with each connected point of consumption.

EP 1 240 564 B1 describes an electronic mixed-water preparation unit and a method for preparing mixed water. This mixed-water preparation unit comprises a mixing body which has a hot-water inlet and a cold-water inlet. The supplied hot and cold water is mixed within the mixing body in response to a temperature sensor in a ratio specified by an electronic control unit to achieve a set temperature specified by an operating unit. One or more water-drawing devices are connectable to the electronic mixed-water preparation unit and are individually controllable, although no distribution details are disclosed. To drive the mixing body, it is said that a stepper motor acts as an actuator via a gear unit on a rotatably mounted actuator, embodied according to the drawing by a spindle leading into the interior of the mixing chamber. The electronic control unit and the actuator with mixing body are arranged in a single device unit sizable for flush mounting.

EP 1 844 380 B1 describes a washing system for a washroom comprising a mixing valve with electronic control system and an electric motor for adjusting the mixing ratio of hot and cold water in the mixing valve. A cold-water connection and a hot-water connection lead into the mixing valve body. At the outlet of the mixing valve and after a damping chamber, the temperature of the mixed water is measured. The ratio between the amount of cold water and the amount of hot water to achieve a desired mixed water temperature is adjusted in a controlled manner in that the electronic control system uses an electric stepper motor and a toothed belt drive to rotate a valve piston rod with threaded guide arranged axially in the mixing chamber, thereby shifting its axial position so as to change the size of grooved openings from the cold-water chamber to the subsequent hot-water chamber. After the outlet of the mixing valve and the damping chamber, the mixed water can be distributed, for example, to one, two or more points of consumption, wherein each point of consumption is individually selected by solenoid valves. The mixing valve with drive, the electronic control system, the damping chamber and the solenoid valves can be housed in one box.

In the prior art, the tendency is apparent that the functional units, which as stated at the beginning are to be understood as a combination of mixer and distributor, should be accommodated in a space-saving manner and, if possible, in one housing. However, the functional units known to date still require a relatively large amount of installation space due to the design and arrangement of their elements and are not yet optimally compact.

It is the object of the present invention to provide an alternative functional unit that is compact and space-saving, making it well suited for concealed installation.

This object is solved by a functional unit with the features of claim 1.

The invention further comprises uses of the functional unit according to the invention.

Preferred embodiments and variants according to the invention result from the respective dependent claims.

A functional unit according to the invention for sanitary installations, having a cold-water inflow and a hot-water inflow and at least one mixed-water outlet, comprises a mixer and a distributor connected to the mixer via a connecting channel, as well as an electronic control system and sensors and electromotive actuators connected thereto, wherein the mixer and the distributor are designed as cartridges having electromotive actuators and the cartridges are designed as valves having axial and/or radial inlets and outlets through which a flow can pass axially, which have disks which are arranged radially in the interior and on top of one another and each have at least one passage opening, of which in each case one disk is rotatable on a stator disk, wherein the rotatable disk is in engagement with an axially rotatable sleeve which is axially arranged in the respective valve and the cavity of which can be flowed through, and said sleeve is operatively connected at its outer circumference to the respective electromotive actuator.

The inventive design principle of such compact cartridges with motor drive via the outer circumference of a sleeve arranged axially in the valve, through which a flow can pass in its cavity and which can be rotated axially, is described in even greater detail for an axial flow control valve in the as yet unpublished PCT application of the same applicant with the number PCT/EP2018/075352, and this is &so hereby declared to be part of the disclosure content of the present application.

In one embodiment of the functional unit according to the invention, both the inlet and the outlet are arranged axially in both cartridges.

In another embodiment of the functional unit according to the invention, the inlet of the mixer cartridge is arranged axially and the outlet is arranged radially, and the inlet of the distributor cartridge is arranged radially and the outlet is arranged axially.

The location of the outlet from the mixer cartridge and the inlet into the distributor cartridge can have an influence on the geometry of the connecting channel.

Preferably, in the functional unit according to the invention, the axially rotatable sleeves have toothing on theft outer circumference.

Preferably, the electromotive actuators of the functional unit according to the invention have a gear unit and a drive wheel designed as a gearwheel.

In one embodiment, in the functional unit according to the invention, the drive wheel designed as a gearwheel is operatively connected by means of a toothed belt to the toothing on the outer circumference of the respective axially rotatable sleeve.

In another, preferred embodiment, the drive wheel designed as a gearwheel engages in the toothing on the outer circumference of the respective axially rotatable sleeve, and the respective sleeve is thus operatively connected to the respective electromotive actuator.

In the functional unit according to the invention, the electromotive actuators are preferably stepper motors or DC motors.

In the functional unit according to the invention, at least one temperature sensor is preferably installed in the connecting channel between the mixer and the distributor, and/or at the outlet of the mixer, and/or at the inlet of the distributor, which acts on the actuator of the mixer via a closed-loop control integrated in the electronic control system.

Preferably, in the functional unit according to the invention, a flow sensor is installed in the connecting channel between the mixer and the distributor.

The distributor of the functional unit according to the invention preferably has one, two or three outlets for mixed water, which can be selected via an operating unit connected to the electronic control system.

Advantageously, in the functional unit according to the invention, the mixer and the distributor with the connecting channel are preferably arranged in such a way that the inflows to the mixer and the outlets of the distributor are on the same side, so that the functional unit can be mounted on a fitting connector with corresponding openings. Preferably, a functional unit designed in this way is accommodated with its components in a compact housing.

In a particular embodiment of the functional unit according to the invention, the functional unit and the fitting connector are integrally formed together.

The present invention also includes the use of a functional unit according to the invention for sanitary installations. Such sanitary installations are preferably concealed sanitary installations in bathrooms for showers and/or bathtubs.

When using a functional unit according to the invention, the sanitary installations comprise a cold-water connection and a hot-water connection to the respective connecting pieces of a fitting connector, and preferably one, two or three outlets to corresponding connecting pieces for mixed water, which is provided by a functional unit mounted on a base body region with mating surfaces of the fitting connector. A functional unit according to the invention is thus preferably mounted on a fitting connector with corresponding fitting surfaces and openings for the water passages.

A fitting connector is the core of a so-called basic unit, which is usually installed flush-mounted. A shower or bathtub fitting having a functional unit according to the invention is thus preferably mounted on a fitting connector installed in the wall. A fitting connector has at least three connection pieces for water lines namely for cold water and hot water, as well as for at least one mixed-water outlet.

For installation in a bathroom, a functional unit according to the invention often has two mixed-water outlets, wherein in the case of a shower the outlet of the mixed water can be selected via the overhead shower and/or the hand shower, or in the case of a bathtub, where the bathtub fitting can be used to select between the bathtub inlet and a shower head.

A functional unit according to the invention can preferably be mounted directly or, optionally, with an intermediate adapter plate on a fitting connector. By means of an adapter plate, a possibly mismatching hole arrangement of the openings between the fitting surfaces of the fitting connector and the functional unit could be bridged.

Preferably, the fitting connector, on which a functional unit according to the invention is mounted or is integrally formed together with it, has movable connection pieces.

A fitting connector with movable connection piece is described in more detail in the not yet published PCT application of the same applicant with file number PCT/EP2019/051432, and this is hereby also declared to be part of the disclosure content of the present application.

In the following, the invention is explained in more detail with reference to figures illustrating examples without limiting the scope of the present invention, wherein:

FIG. 5);

Figure 1:
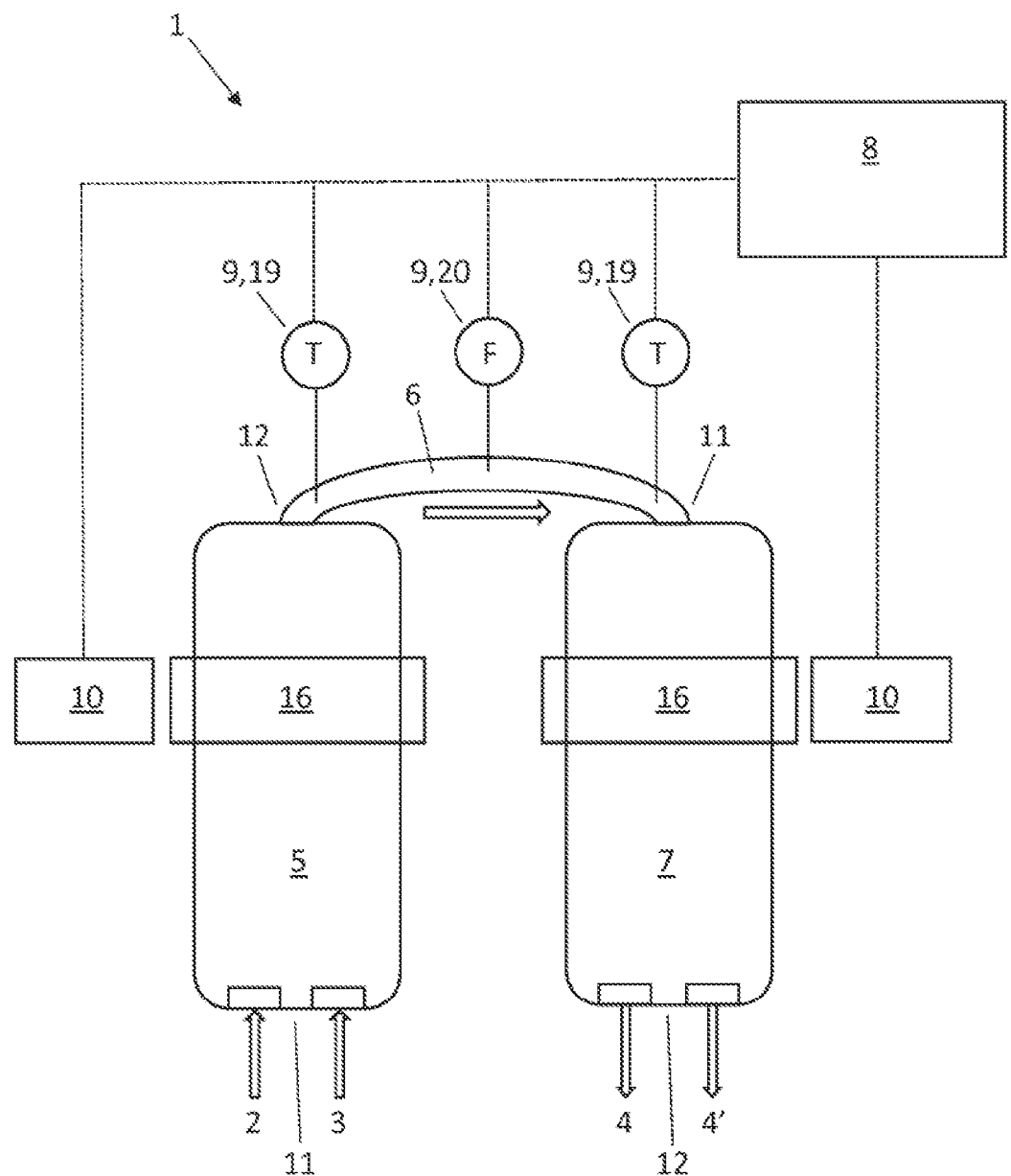
FIG. 1 shows a schematic representation of a functional unit according to the invention.

FIG. 1 shows a schematic representation of a functional unit 1 according to the invention. The mixer cartridge 5 has an axial inlet 11 with cold-water inflow 2 and hot-water inflow 3. The outlet 12 of the mixer cartridge 5 is drawn here axially, and then extends in an actuate connecting channel 6 to the axial inlet 11 in the distributor cartridge 7. The outlet 12 of the distributor cartridge 7 is axial and comprises here the two mixed-water outlets 4 and 4'. Due to this preferred actuate arrangement, the inflows 2, 3 to the mixer 5 and the outlets 4, 4' of the distributor 7 are on the same side, which shall be referred to here as "below", regardless of the position of the functional unit 1 in a subsequent installation in a sanitary device. Such an arrangement, which is preferred according to the invention, permits a compact design and simple mounting on a fitting connector. Also visible in FIG. 1 is in each case the schematically drawn outer circumference 16 of the axially rotatable sleeve 15 located inside the cartridges (not visible here), wherein the outer circumference 16 is in each case operatively connected to an electromotive actuator 10. The electromotive actuators 10 as well as sensors 9, e.g. temperature sensors 19 (symbol T) and optionally a flow sensor 20 (symbol F), are connected to the electronic control 8. Operating units (not shown here) can be connected to the electronic control 8 via interfaces, via which, among other things, setpoints for mixed-water temperatures can be entered, which influence the valve position in the mixer cartridge 5 accordingly via a closed-loop control integrated in the electronic control 8. Alternatively, an operating unit is used to select the desired outlet 4 and/or 4' of the distributor 7 and, optionally, a desired flow rate in addition (depending on the set degree of opening of the disks 13, 14 with their passage openings, which are not visible here), whereupon the electromotive actuator 10 effects the corresponding valve position in the distributor cartridge 7.

Figure 2:
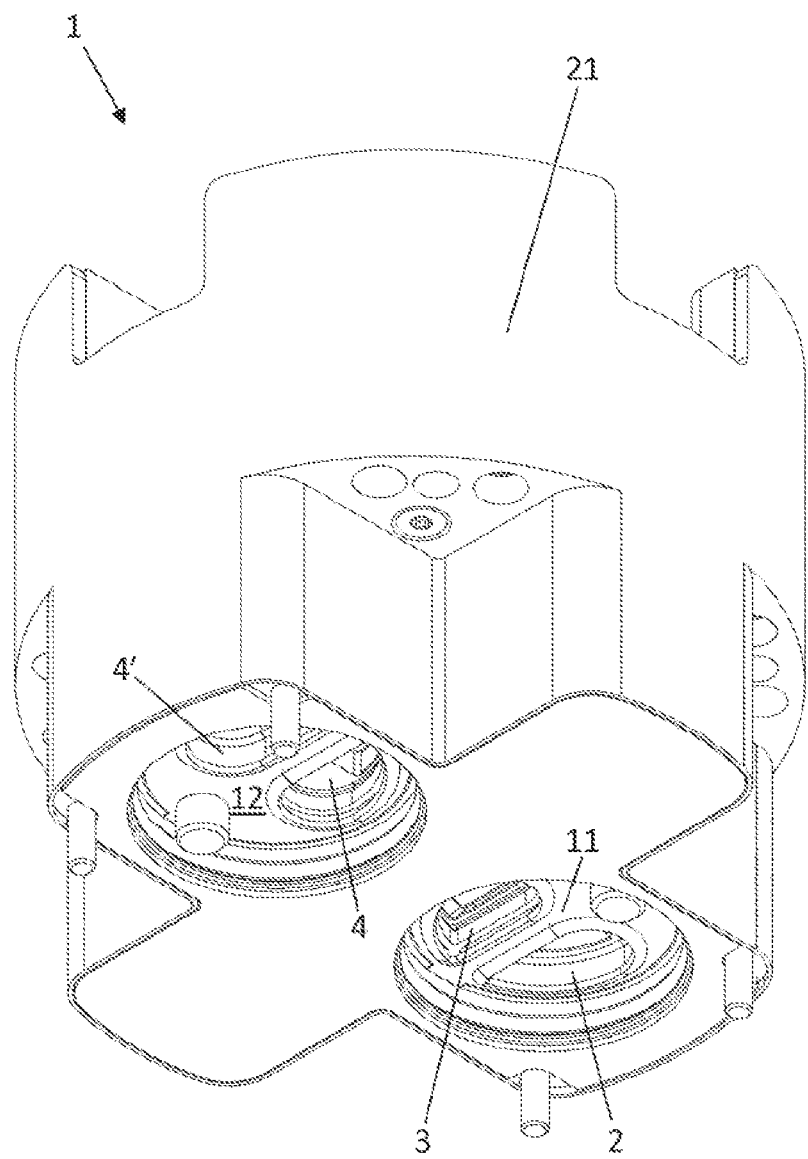
FIG. 2 shows a functional unit according to the invention in a perspective

FIG. 2 shows an implemented functional unit 1 according to the invention in a preferred compact arrangement, i.e. with the inflows 2, 3 and the outlets 4, 4' on the same side ("below"), in a perspective view from obliquely below. The components of this compactly arranged functional unit 1 are thereby accommodated in a housing 21.

Figure 3:
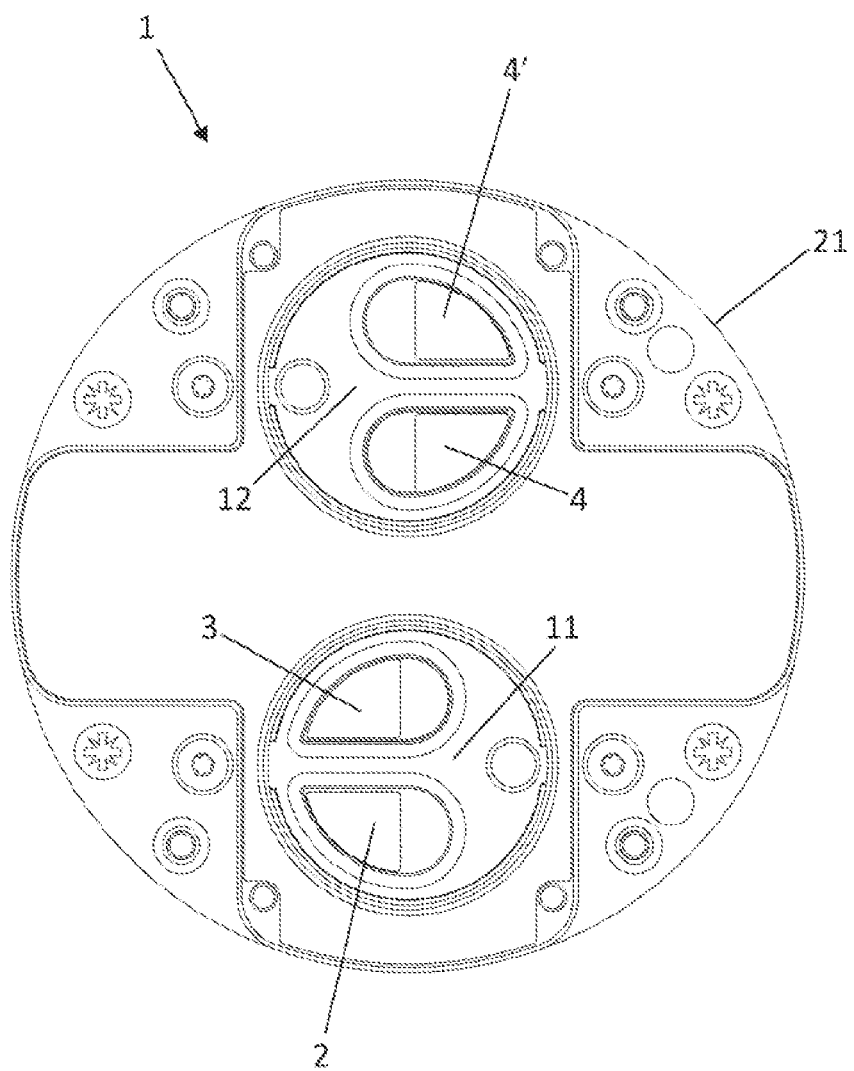
FIG. 3 shows a functional unit according to the invention in a view from below.

FIG. 3 shows the functional unit 1 according to the invention from FIG. 2 in a view exactly from below.

Figure 4:
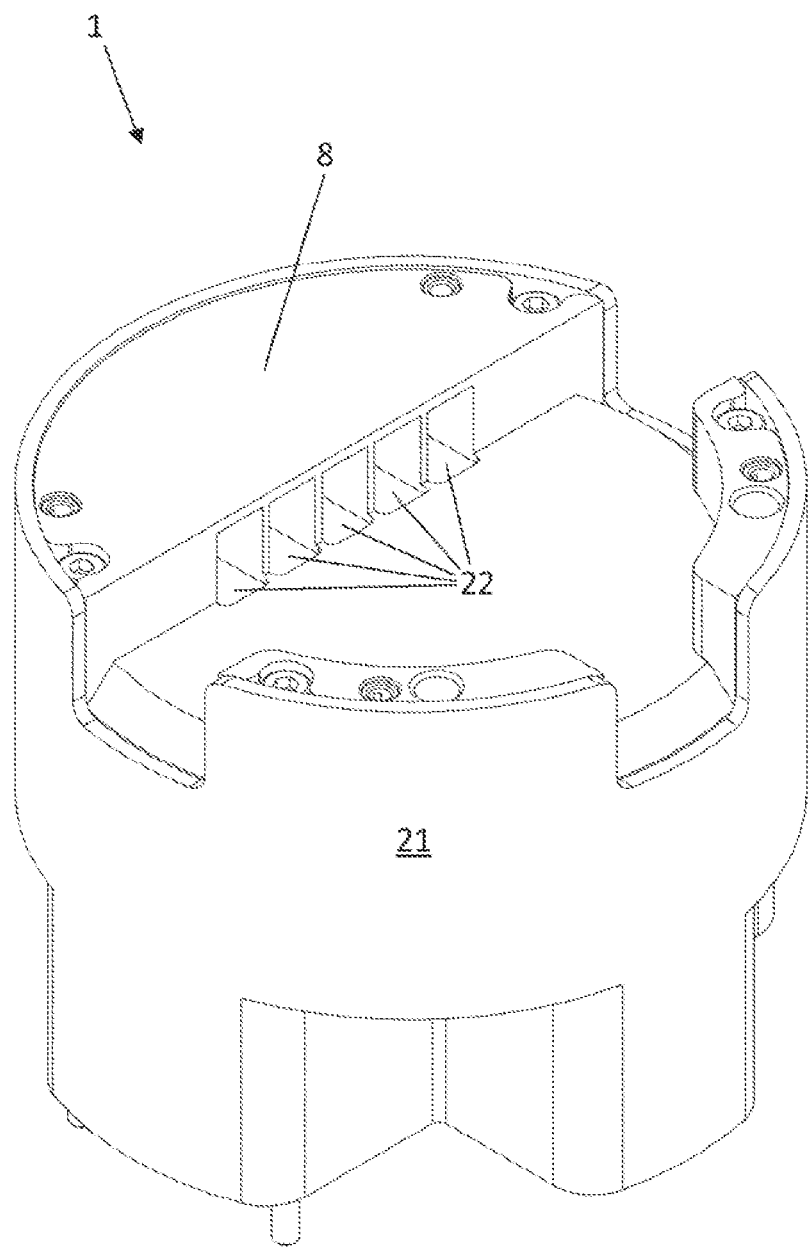
FIG. 4 shows another perspective view of a functional unit according to the invention.

FIG. 4 shows the functional unit 1 according to the invention from FIG. 2 in a perspective view obliquely from above. The electronic control 8 is also accommodated in the compact housing 21 under the lid. Furthermore, slots 22 for interfaces are visible on the upper side of the housing 21 near the lid.

Figure 5:
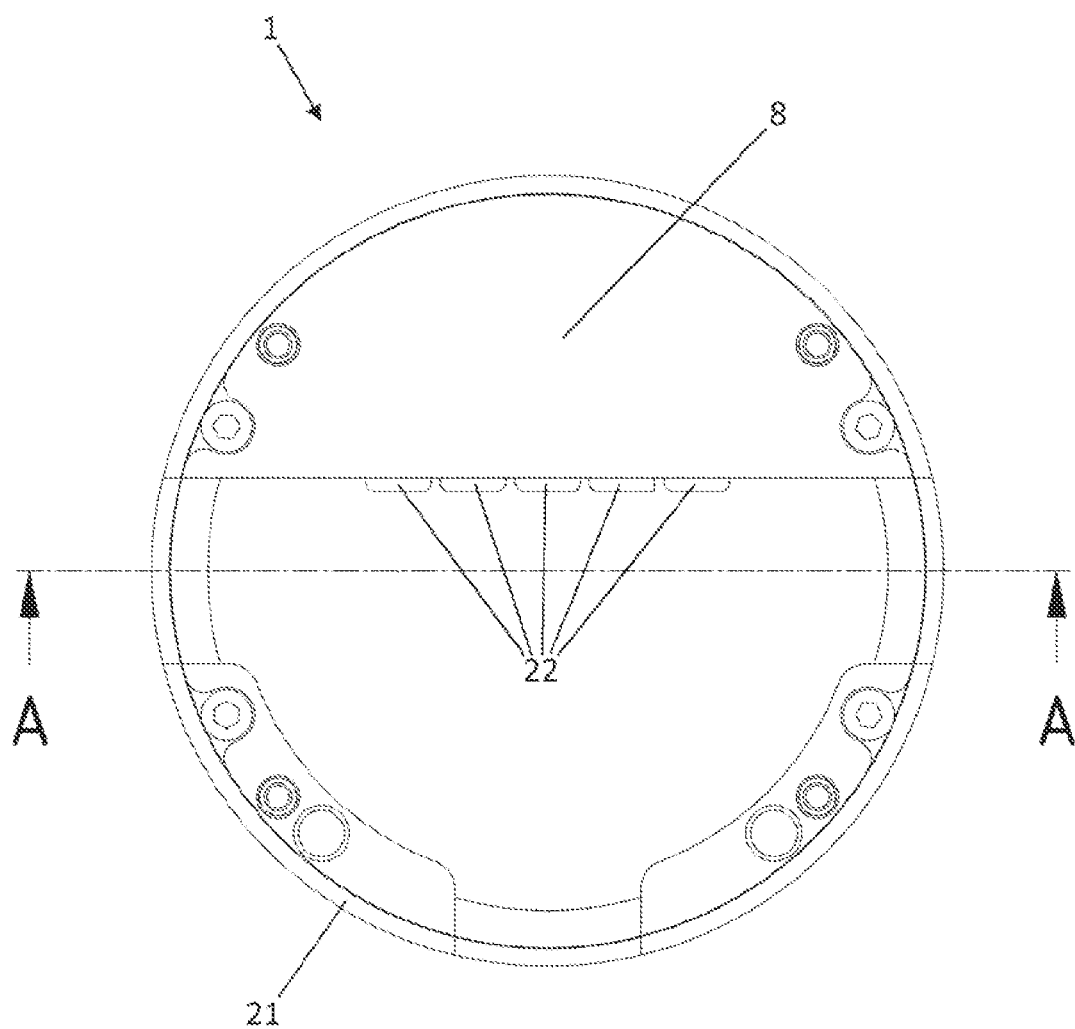
FIG. 5 shows a functional unit according to the invention in a top view.

FIG. 5 shows the functional unit 1 according to the invention from FIG. 4 in a top view exactly from above.

Figure 6:
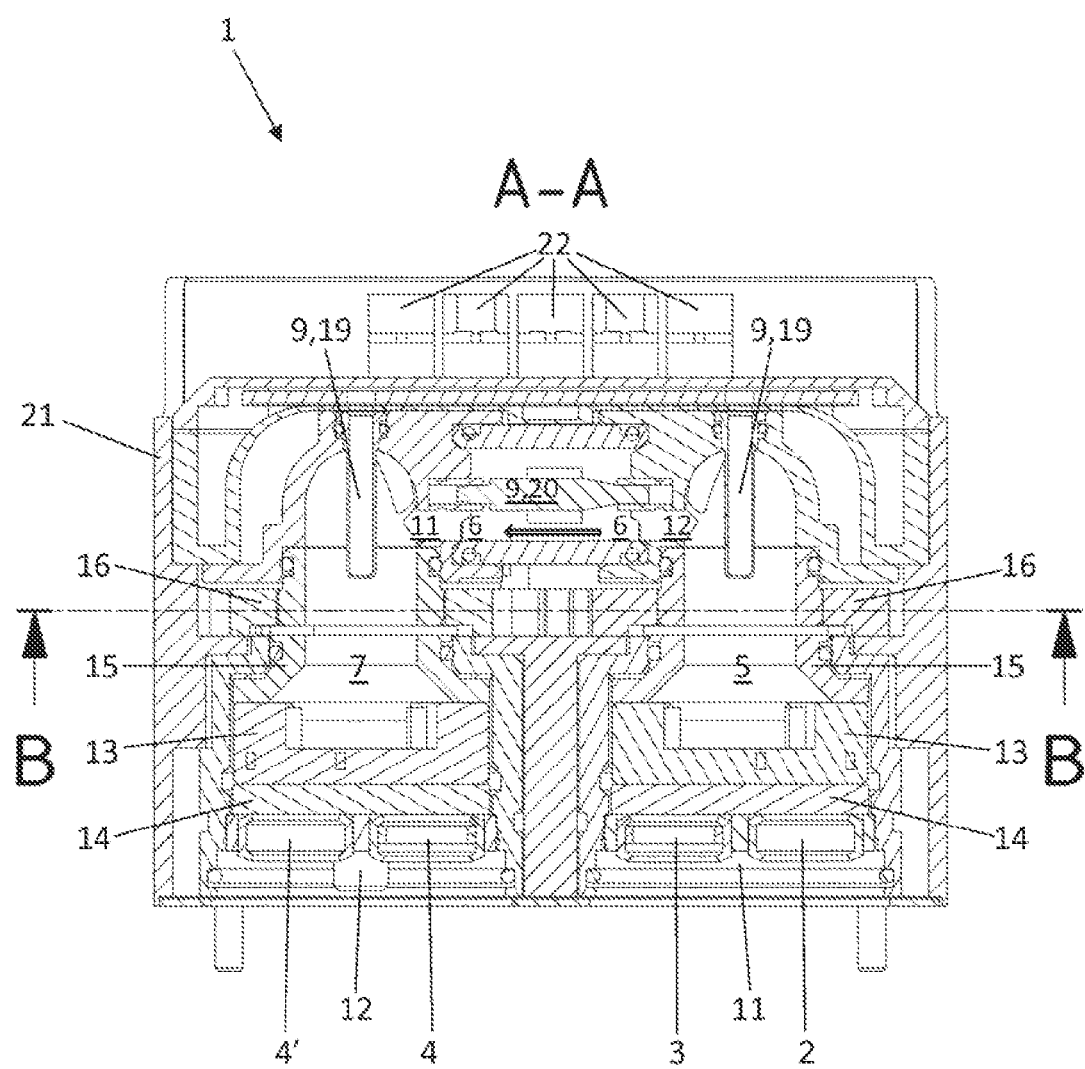
FIG. 6 shows a functional unit according to the invention as seen from a section in the plane A-A (cf.

FIG. 6 shows an implemented functional unit 1 according to the invention, looking at a section in the vertical plane A-A marked in FIG. 5. This section shows implemented components analogous to the schematic representation of FIG. 1, but in FIG. 6 the mixer cartridge 5 is on the right and the distributor cartridge 7 is on the left. Consequently, in the connecting channel 6 the flow direction of the mixing water is from right to left. The outlet 12 of the mixer cartridge 5 and the inlet 11 of the distributor cartridge 7 are of radial design in this case. As a result, the connecting channel 6 is straight instead of curved. A turbine flowmeter 9, 20 is arranged in the connecting channel 6. Temperature sensors 9, 19 are installed here both at the outlet 12 of the mixer cartridge 5 and at the inlet 11 of the distributor cartridge 7, Also visible in this section are the axially rotatable sleeves 15 with theft outer circumference 16, the rotatable disks 13 in engagement with the sleeves 15, and the stator disks 14.

Figure 7:
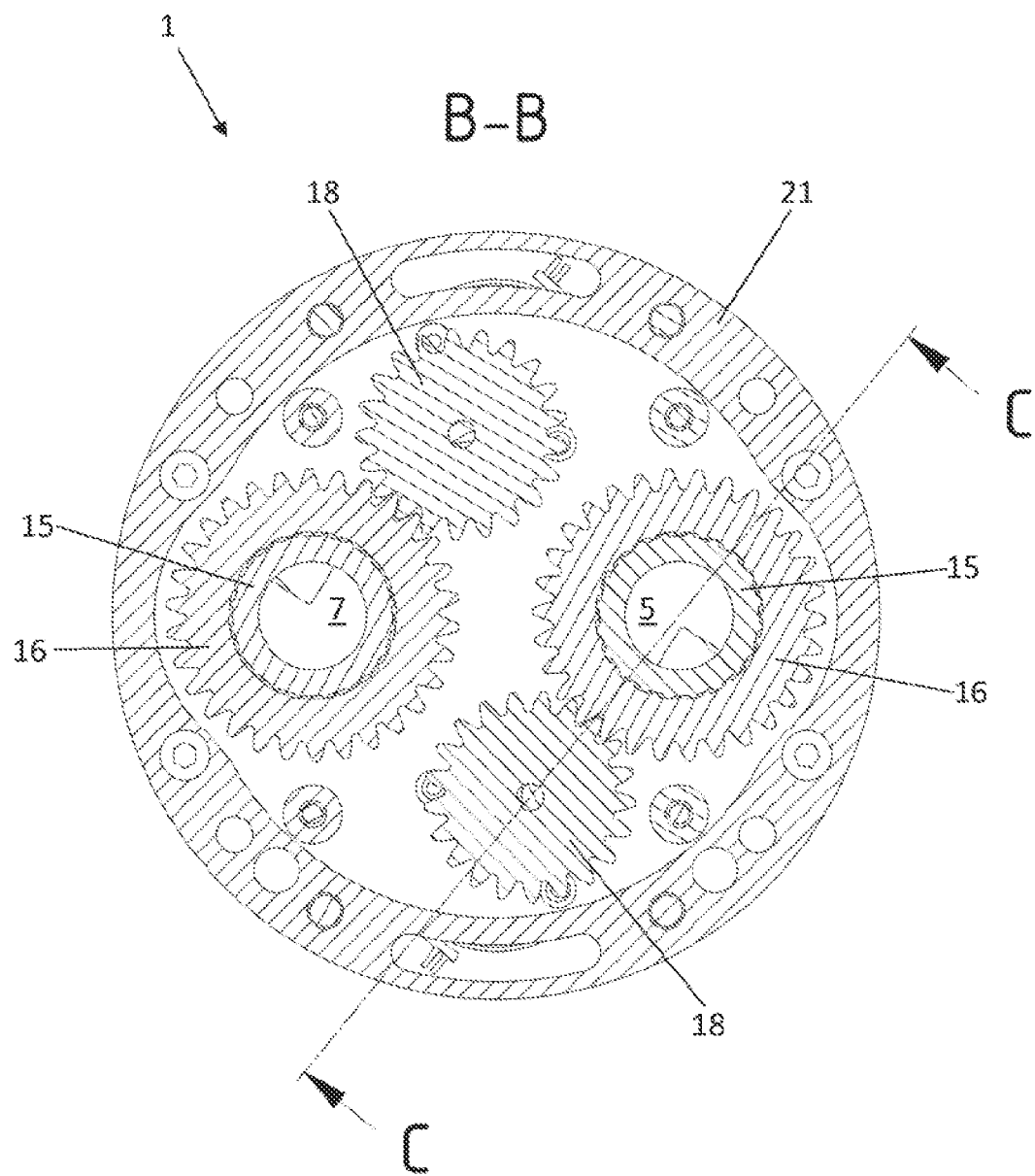
FIG. 7 shows a functional unit according to the invention in a cross-sectional profile through the sectional plane B-B (see FIG. 6)

FIG. 7 shows the implemented functional unit 1 according to the invention of FIG. 6 in a cross-sectional profile through the sectional plane B-B marked in FIG. 6. Here, the preferred embodiment of the drive is now clearly visible, in which the outer circumference 16 of the axially rotatable sleeves 15 has a toothing in which the drive wheel 18, designed as a gearwheel, of the respective, electromotive actuator 10 engages.

Figure 8:
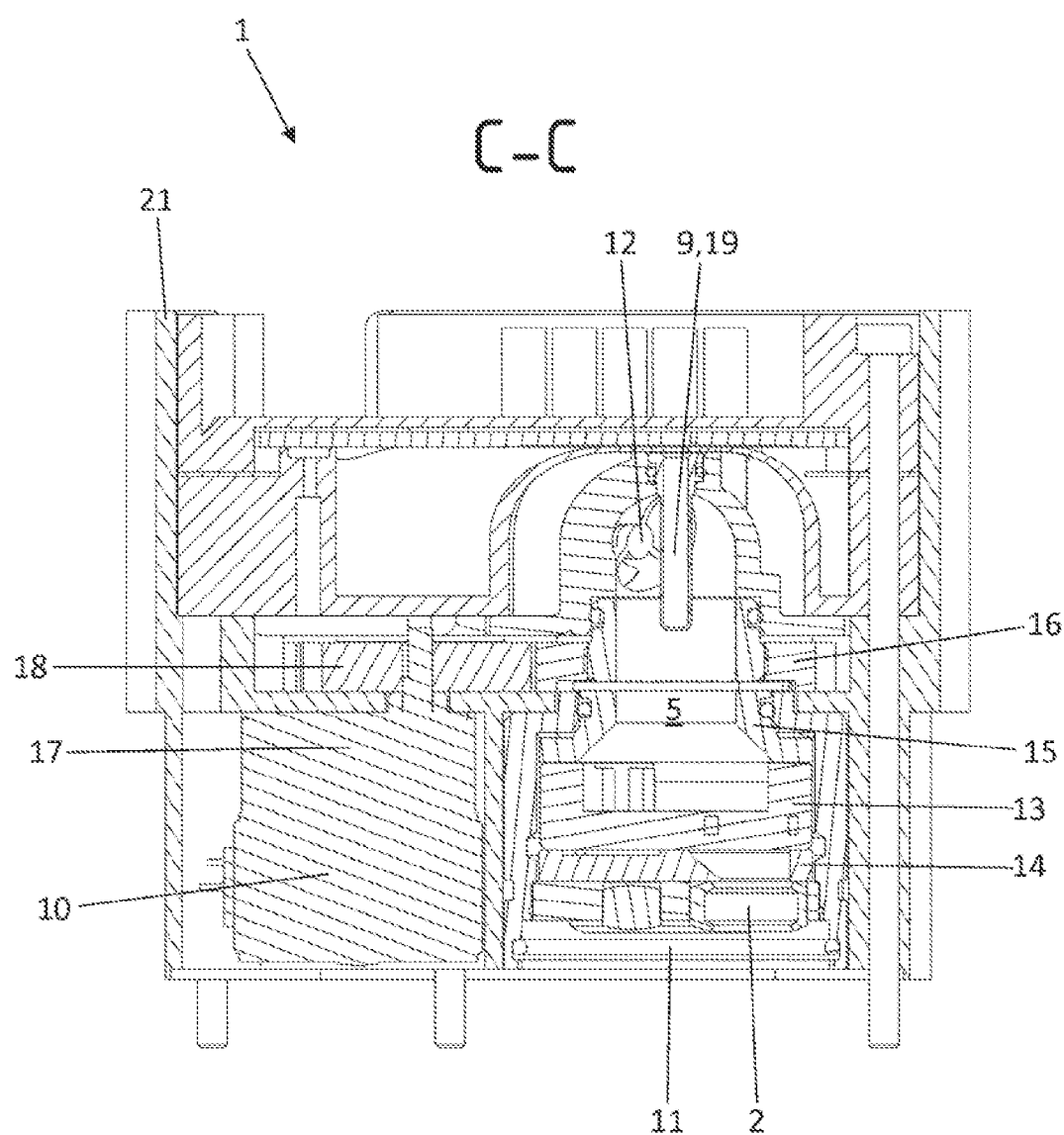
FIG. 8 shows a functional unit according to the invention with a view of a section in the pane C-C (cf, FIG. 7).

Finally, FIG. 8 shows the implemented functional unit 1 according to the invention of the previous figures with a view of a section in the sectional plane C-C marked in FIG. 7. The mixer cartridge 5 is shown here with the electromotive actuator 10 arranged next to it. A gear unit 17 is connected to the actual motor and drives the drive wheel 18, which is designed as a gear wheel, via a shaft. The latter is in engagement with the outer circumference 16 of the axially rotatable sleeve 15, which comprises a toothing. The entire arrangement and construction of the components of this functional unit 1 according to the invention is, as can be seen, very space-saving and compact.

At this point, it should be noted that any combinations of the features described and/or shown in the figures are within the scope of the present invention as long as the combinations are not inconsistent As can be seen from the description and the explanations of the fixtures, the present invention provides an advantageous and compact alternative solution for a functional unit. This can be mounted in a simple manner on a fitting connector with corresponding openings or can also be designed integrally together with a fitting connector.

LIST OF REFERENCE SIGNS

Identical reference signs in the figures indicate corresponding features, even if not explicitly referred to in the description of the individual figures in each case.

1 Functional unit
2 Cold-water inflow
3 Hot-water inflow
4, 4' Mixed-water outlet
5 Mixer, mixer cartridge
6 Connecting channel
7 Distributor distributor cartridge
8 Electronic control
9 Sensor
10 Electromotive actuator
11 inlet into mixer or distributor cartridge
12 Outlet from mixer or distributor cartridge
13 Rotatable disk
14 Stator disk
15 Axially rotatable sleeve
16 Outer circumference of axially rotatable sleeve 15
17 Gear unit of electric motor actuator 10
18 Drive wheel
19 Temperature sensor
20 Flow sensor
21 Housing
22 Slots for interfaces

The invention claimed is:
1. A functional unit (1) for sanitary installations having a cold-water inflow (2) and a hot-water inflow (3) and at least one mixed-water outlet (4, 4'), comprising: a mixer (5); a distributer (7) connected to the mixer (5) via a connecting channel (6); an electronic control (8); sensors (9) and electromotive actuators (10) connected to the electronic control; wherein the mixer (5) and the distributer (7) are each a cartridge operated via an associated on of the electromotive actuators (10); wherein each cartridge is an axial flow valve having an axial and/or radial inlet and outlet (11, 12); wherein each axial flow valve has a rotatable disk (13) and a stator disk (14) in an interior thereof, with the rotatable disk (13) and the stator disk (14) arranged radially with the rotatable disk (13) on top of the stator disk (14); wherein the rotatable disk (13) and the stator disk (14) each has at least one passage opening and wherein the rotatable disk (13) is rotatable on the stator disk (14); wherein each axial flow valve has an axially rotatable sleeve (15) having a cavity which is flowable through that is axially arranged therein; wherein each rotatable disk (13) is in engagement with the respective axially rotatable sleeve (15); and wherein each axially rotatable sleeve (15) is operatively connected at an outer circumference (16) thereof to a respective one of the electromotive actuators (10).

2. The functional unit (1) according to claim 1, wherein the inlet (11) is arranged axially and the outlet (12) radially in the mixer cartridge (5), and the inlet (11) is arranged radially and the outlet (12) axially in the distributor cartridge (7).

3. The functional unit (1) according to claim 1, wherein the axially rotatable sleeves (15) comprise a toothing on their outer circumference (16).

4. The functional unit (1) according to claim 1, wherein the electromotive actuators (10) comprise a gear unit (17) and a drive wheel (18) designed as a gearwheel.

5. The functional unit (1) according to claim 4, wherein the drive wheel (18) is operatively connected by means of a toothed belt to a toothing on the outer circumference (16) of the respective axially rotatable sleeve (15).

6. The functional unit (1) according to claim 4, wherein the drive wheel (18) engages in a toothing on the outer circumference (16) of the respective axially rotatable sleeve (15), and thus the respective sleeve (15) is operatively connected to the respective electromotive actuator (10).

7. The functional unit (1) according to claim 1, wherein the electromotive actuators (10) are stepper motors or DC motors.

8. The functional unit (1) according to claim 1, comprising at least one temperature sensor (19) installed in the connecting channel (6) between the mixer (5) and the distributor (7), and/or at the outlet (12) of the mixer (5), and/or at the inlet (11) of the distributor (7), which temperature sensor (19) acts on the actuator (10) of the mixer (5) via a closed-loop control integrated in the electronic control (8).

9. The functional unit (1) according claim 1, comprising a flow sensor (20) installed in the connecting channel (6) between the mixer (5) and the distributor (7).

10. The functional unit (1) according to claim 1, wherein the distributor (7) has one, two or three outlets (4, 4', 4") for mixed water, which are selectable via an operating unit connected to the electronic control (8).

11. The functional unit (1) according to claim 1, wherein the mixer (5) and the distributor (7) with the connecting channel (6) are arranged in so that the inflows (2, 3) to the mixer (5) and the outlets (4, 4') of the distributor (7) are on the same side, so that the functional unit (1) can be mounted on a fitting connector with corresponding openings.

12. The functional unit (1) according to claim 11, wherein the functional unit (1) is accommodated with its components in a compact housing (21).

13. The functional unit (1) according to claim 11, wherein the functional unit (1) and the fitting connector are integrally formed together.

14. A sanitary installation comprising the functional unit (1) according to claim 1.

15. The sanitary installation according to claim 14 wherein the sanitary installation is a concealed sanitary installation for showers and/or bathtubs.

16. The sanitary installation according to claim 14, wherein the sanitary installation comprises a cold-water connection and a hot-water connection to respective connection pieces of a fitting connector having mating surfaces, and one, two or three outlets to respective connection pieces for mixed water provided by the functional unit (1) mounted on a base body region with the mating surfaces of the fitting connector.

* * * * *